(12) United States Patent
Meijer et al.

(10) Patent No.: US 9,179,516 B2
(45) Date of Patent: Nov. 3, 2015

(54) COLOR CONTROLLED LIGHT SOURCE AND A METHOD FOR CONTROLLING COLOR GENERATION IN A LIGHT SOURCE

(75) Inventors: Eduard J. Meijer, Eindhoven (NL); John B. Mills, Eindhoven (NL); Volkmar Schulz, Wuerselen (DE); Bernd Ackerman, Aachen (DE); Lorenzo Feri, Eindhoven (NL); Hans M. B. Boeve, Hechtel-Eksel (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 715 days.

(21) Appl. No.: 12/446,482
(22) PCT Filed: Oct. 23, 2007
(86) PCT No.: PCT/IB2007/054305
§ 371 (c)(1),
(2), (4) Date: Apr. 21, 2009

(87) PCT Pub. No.: WO2008/050293
PCT Pub. Date: May 2, 2008

(65) Prior Publication Data
US 2010/0327755 A1    Dec. 30, 2010

(30) Foreign Application Priority Data
Oct. 27, 2006   (EP) .................................. 06123052
Feb. 19, 2007   (EP) .................................. 07102609

(51) Int. Cl.
*G01J 1/32*     (2006.01)
*H05B 37/02*    (2006.01)
*H05B 33/08*    (2006.01)

(52) U.S. Cl.
CPC .......... *H05B 33/0869* (2013.01); *H05B 33/086* (2013.01); *H05B 33/0818* (2013.01); *H05B 37/0245* (2013.01); *Y02B 20/341* (2013.01)

(58) Field of Classification Search
USPC ................ 250/201.1, 205, 226; 315/149–159
See application file for complete search history.

(56) References Cited

U.S. PATENT DOCUMENTS 4,947,362 A * 8/1990 Bui ............................... 708/322
5,965,875 A   10/1999 Merrill
(Continued)

FOREIGN PATENT DOCUMENTS

EP   1551061 A2   7/2004
EP   1635617 A2   3/2006
(Continued)

OTHER PUBLICATIONS

E. F. Zalewiski and J. Geist, Silicon photodiode absolute spectral response self-calibration, Apr. 15, 1980, Applied Optics, vol. 19, No. 8, 1214-1216.*

*Primary Examiner* — Renee D Chavez
(74) *Attorney, Agent, or Firm* — Meenakshy Chakravorty

(57) ABSTRACT

This invention relates to a color controlled light source comprising a plurality of colored light elements, and a plurality of (filtered) photo detectors, having different spectral characteristics covering all or most of the total spectrum of the light elements. The (filtered) photo detectors detect the light output of the light source, and generate corresponding detection signals. The light source further has a color control unit for generating driving signals to the light elements on the basis of the detection signals and a predetermined target color point of the light output of the light source, and a modulator for individual signature modulation of the driving signal to each one of said light elements. A corresponding demodulator is provided for demodulation of the detection signals and extraction, from each detection signal, of actual values of the light outputs of the light elements. The color control unit has means for determining the spectral output of each light element on basis of the actual values, means for determining an actual color point from said spectral outputs of all light elements, and means for comparing said target color point with said actual color point and, if there is a difference, adjusting said driving signals in order to minimize the difference.

17 Claims, 5 Drawing Sheets

(56) References Cited

U.S. PATENT DOCUMENTS

| | | | |
|---|---|---|---|
| 2001/0007505 A1* | 7/2001 | Lee et al. | 358/500 |
| 2002/0071161 A1* | 6/2002 | Perkins et al. | 359/154 |
| 2004/0030229 A1* | 2/2004 | Norris | 600/323 |
| 2005/0259439 A1* | 11/2005 | Cull et al. | 362/612 |
| 2006/0043265 A1 | 3/2006 | Nishimura | |
| 2006/0071613 A1 | 4/2006 | Lovato et al. | |
| 2006/0239689 A1 | 10/2006 | Ashdown | |

FOREIGN PATENT DOCUMENTS

| | | |
|---|---|---|
| WO | 03037042 A1 | 5/2003 |
| WO | 2004054001 A2 | 6/2004 |
| WO | 2006077968 A1 | 7/2006 |
| WO | 2006111930 A2 | 10/2006 |

* cited by examiner $$S(\lambda) = \frac{A_0}{1 + e^{\frac{-(\lambda - \lambda_{peak})}{W_1}}} \left[ 1 - \frac{1}{1 + e^{\frac{-(\lambda - \lambda_{peak})}{W_2}}} \right] + A_1$$
FIG. 5
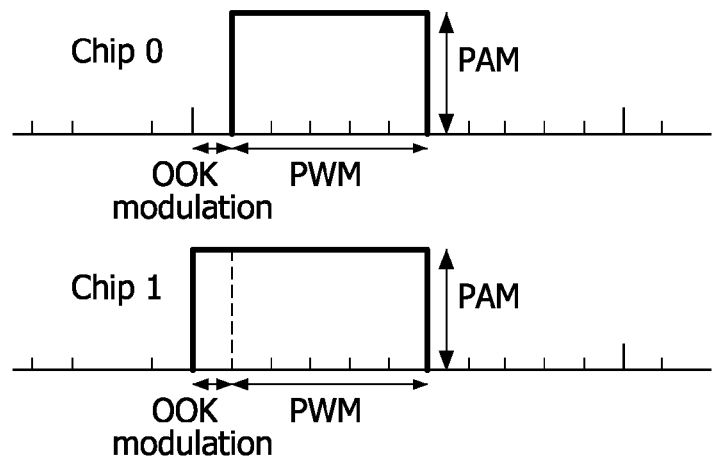
FIG. 6
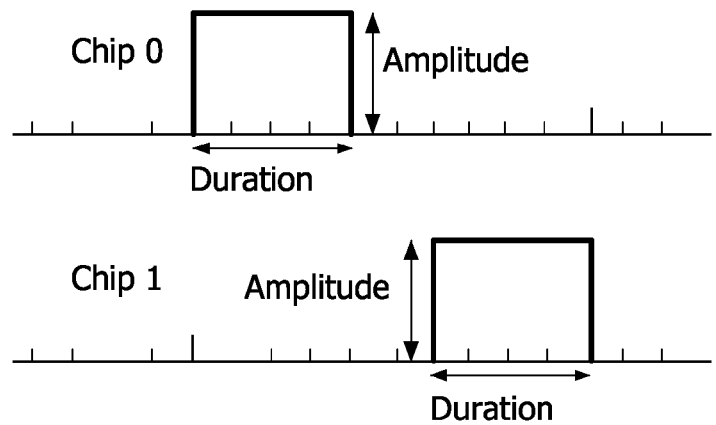
FIG. 7

COLOR CONTROLLED LIGHT SOURCE AND A METHOD FOR CONTROLLING COLOR GENERATION IN A LIGHT SOURCE

FIELD OF THE INVENTION

The present invention relates to Solid State Lighting, and more particularly relates to a color controlled light source according to the preamble of claim 1, and to a method for controlling color generation in a light source according to the preamble of claim 12.

BACKGROUND OF THE INVENTION

In order to realize a light source for multiple colors, e.g. different color temperatures, in Solid State Lighting, LEDs emitting light of different colors, are used in one device. These LEDs define a sub area in the color space indicating the color gamut that can be realized via all possible linear combinations. Colored light of desired intensity within the color spectrum of the color space can hence be controlled by means of the signal input of the individual LEDs. It should be noted that white light is included in the term colored light.

Unlike traditional light sources colored LEDs will "color shift" due to the changes of the junction temperature, the current, aging effects and binning of the LEDs. As the light output starts to wane from the pre-defined color point due to temperature and aging, the color point of the light output of the light source will become distorted. Consequently, the color point of the light source has to be stabilized via a control loop.

For the purpose of monitoring the light output from a light source it is quite common to use light detectors, such as RGB-sensors or true-color-sensors having the same sensitivity as the standard observer or approximating these curves. Alternatively, flux sensors are used, possibly in combination with one or more temperature sensors. In order to be able to determine the contribution from individual LEDs or colors, which can be a group of LEDs as well, filtering techniques have been used. Thus, for example, three different 'filtered' photo detectors detecting primary colors (such as red, green, and blue light), respectively, have been employed in combination with one unfiltered photo detector. Based on the photo detector output signals, a measured color point of the light output of the light source has been determined and compared with a target color point in order to adjust the driving currents to the LEDs, if necessary.

However, when the light detectors detect the light output there may be interference from other light sources, for instance ambient sunlight and/or other color-LEDs or other interference sources creating electrical noise. The measured color point is therefore often defective and does not solely represent the light output from the LEDs, in the light source itself. Consequently the feedback signal to the control device of the control loop is incorrect.

SUMMARY OF THE INVENTION

It is an object of the present invention to provide a light source and a method for controlling color generation in a light source that alleviates the above-mentioned interference problems in the color control.

This object is achieved by a color controlled light source according to the present invention as defined in claims 1 and 12. The appended sub-claims define preferred embodiments of the invention.

Thus, in accordance with an aspect of the present invention, there is provided a color controlled light source comprising:

a plurality of colored light elements;

a plurality of photo detectors, whose spectral characteristics are different and together at least substantially cover the total spectrum of said light elements, which photo detectors detect the light output of the light source, and generate corresponding detection signals; and a color control unit for generating driving signals to said light elements on the basis of said detection signals and a predetermined target color point of the light output of the light source.

The light source further comprises:

a modulator for individual signature modulation of the driving signal to each-one of said light elements; and a demodulator for individual signature demodulation of said detection signals and extraction, from each detection signal, of each actual value of the light output of each one of said light elements.

The color control unit comprises:

means for determining the spectral output of each light element on the basis of said actual values;

means for determining an actual color point from said spectral outputs of all light elements; and means for comparing said target color point with said actual color point and, if there is a difference, adjusting said driving signals in order to minimize the difference.

Thus, according to the invention an accurate determination of the actual spectral output of each light element, performed by the means for determining the spectral output, is combined with an accurate identification of the contribution from each individual light element to the detected output light, which provides good measurements to the spectral output determination means. Other advantages are that all light elements can be on at the same time and the sensitivity to ambient light is very low. Additionally, it should be noted that there is no need for LED bin information or manufacturer information.

In accordance with an embodiment of the color controlled light source, as defined in claim 2, the modulator is a spread spectrum modulator. Spread spectrum modulation, or coding, is an efficient way of sending plural signals in common and being able to detect them at a receiver at a low error rate, which is commonly used in radio transmission, and which has shown most useful in the present light source.

In accordance with an embodiment of the color controlled light source, as defined in claim 3, the modulator is a CDMA modulator. CDMA, i.e. Code Division Multiple Access, is advantageous to use for code modulating the driving signals, providing well-differentiated individual codes. Advantageous embodiments, as defined in claim 4, employ On-Off Keying or BiPhase modulation.

In accordance with an embodiment of the color controlled light source, as defined in claim 8, the means for determining the spectral output is arranged to determine the spectral output by means of an algorithm for asymmetric function modeling of the spectral output of a light element. The spectrum of, for example, a LED is typically asymmetrical, and is well described by such a function. An advantageous choice of such a function, as defined in claim 9, is an asymmetric double sigmoidal function.

In accordance with an embodiment of the color controlled light source, as defined in claim 10, the means for determining the spectral outputs employs a minimization algorithm using predetermined and measured values of the spectral output in order to determine a best fit for the detected LED spectrum.

In accordance with an embodiment of the color controlled light source as defined in claim 11, Gold codes are used for the individually signature coded modulation. Gold codes as such are well known to a skilled person and are generatable in large numbers and have low cross-correlation. They are advantageous to use in order to separate the coding of two different light sources, which would otherwise interfere causing the control device of one light source to incorrectly recognize a spectral output of the interfering light source.

According to another aspect of the present invention, there is provided a method for controlling color generation in a light source, as defined in claim 12.

The same or corresponding objects and advantages as obtained with the light source according to the above aspect and embodiments are obtained with this method and its embodiments as defined in the further claims.

These and other aspects of the invention will be apparent from and elucidated with reference to the embodiments described hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will now be described in more detail and with reference to the appended drawings, in which:

FIG. 5 shows a spectral modeling function used in embodiments of the light source;

FIG. 6 shows the use of CDMA OnOff-Keying modulation with pulse width modulation (PWM) and pulse amplitude modulation (PAM), according to another embodiment of the light source; and FIG. 7 shows the use of CDMA BiPhase (DC-BP) modulation with Duty Cycle modulation and amplitude modulation, according to a further embodiment of the light source.

DESCRIPTION OF PREFERRED EMBODIMENTS

Figure 1:
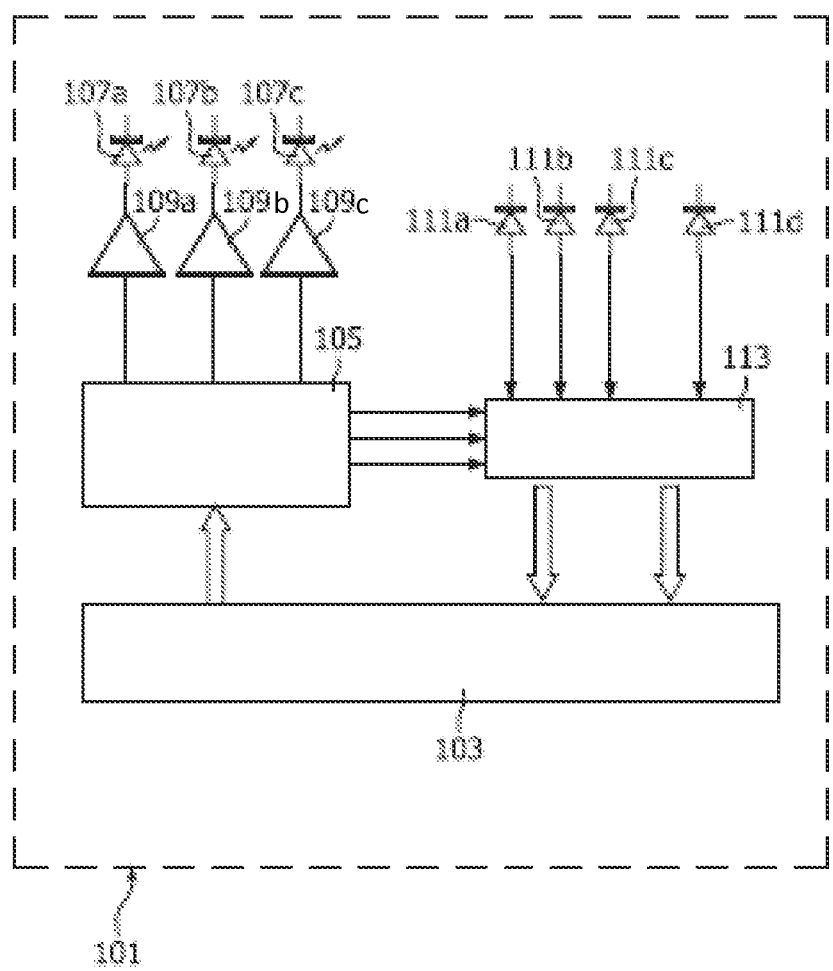
FIG. 1 is a schematic diagram of an embodiment of a light source according to the present invention.

An embodiment of the color controlled light source 101 according to the present invention is shown in FIG. 1. It has a light generation path comprising a color control unit 103, a CDMA modulator 105, and N colored light elements 107a-c, where N=3 in this embodiment, including drivers 109a-c. Typically, the light elements are LEDs, and more particularly RGB LEDs, i.e. a red LED 107a, a green LED 107b, and a blue LED 107c. Many other combinations of primary light elements are, however, also applicable depending on the aimed use of the light source 101. The color control unit 103 is connected to the CDMA modulator 105 for providing it with driving signals. The CDMA modulator 105 has three outputs connected via the drivers 109a-c to the light elements 107a-c for individual signature modulation, by means of spread spectrum coding, and more particularly CDMA coding, of the driving signals. Typically, the driving signals fed to the LEDs 107a-c are maximum level currents, which are pulsed, such as by means of PWM. Alternatively, analog drive signals (DC or arbitrary analogue waveform) for the light elements may be provided by the drivers 109a-c.

Further the light source 101 has a light detection path comprising M, where M=3 in this embodiment, 'filtered' photo detectors, here photodiodes, 111a-c, an unfiltered photo detector 111d, a CDMA demodulator 113, and the color control unit 103. The photo detectors 111a-d are connected to the CDMA demodulator 113, providing detection signals representing the detected light output of the light source 101 thereto, and the CDMA demodulator is connected to the color control unit 103, providing actual values of the light output of each separate light element 107a-c to the control unit 103. Additionally, the CDMA modulator 105 is connected to the CDMA demodulator 113, providing it with copies of the CDMA codes. The 'filtered' photo detectors 111a-c can be provided with filters which cover at least a substantial part of the visible spectrum, or the total spectrum of the LEDs 107a-c, and which are distributed across that range. For example, the filters are band-pass filters, where a first filter is spectrally centered at a red wavelength, a second filter is spectrally centered at a green wavelength, and a third filter is spectrally centered at a blue wavelength.

Alternative to filtered photo detectors 111a-c, several silicon photodiodes 111a-c (see FIG. 2) can be used adjacent to each other, each equipped with a pn-junction at a different junction depth 210 (position multiplexing). It is well known that photon absorption in silicon depends on the photon energy. In other words, the photon flux inside silicon follows Beer's Law, with a wavelength depend absorption coefficient: blue light is strongly absorbed, whereas red light is able to penetrate deeply into the silicon. Alternatively, the use of a single photodiode with three pn-junctions on top of each other is also possible. This configuration can be achieved with a large amount of control over the doping profiles of donors and accepters in the silicon, which define the junction depth 210, using selective epitaxial growth. Alternative to the multiple junction approach, it is also possible to use a single silicon photodiode with a single pn-junction in combination with a time dependent variable bias voltage to control the width of the space charge region of the junction (time multiplexed). As the pn-junction depth 210 and the width of the depletion region 220 define the spectral response, such silicon photodiodes form a special kind of RGB-sensor. These silicon photodiodes have the benefit of avoiding the use of (often expensive and spectrally degrading) filters.

Figure 2:
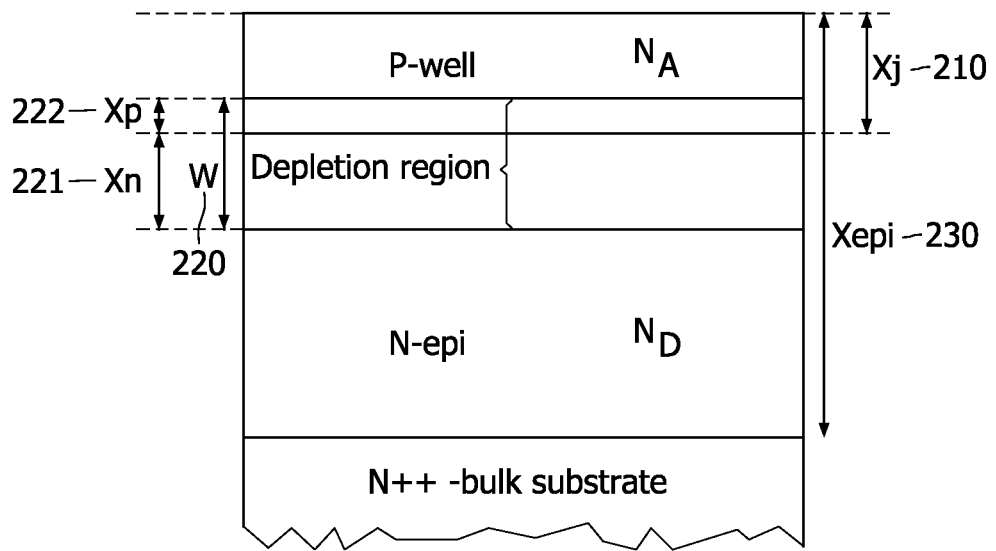
FIG. 2 shows the structure of a pn-junction in a silicon photodiode used as a detector in an embodiment of a light source, according to the present invention.

The spectral responsivity of a silicon pn-junction as a function of the junction depth 210 and the depletion region width 220 can be calculated as follows (see FIG. 2). The photocurrent is composed of two components: the drift current due to the drift of holes and electrons in the depletion region, and the diffusion current due to the diffusion of carriers outside the depletion region.

$$J_{opt} = J_{drift} + J_{diff} \qquad \text{Eqn. 1}$$

The drift current is given by:

$$J_{drift} = q\Phi_0 e^{-\alpha(\lambda)(xj-xp)}(1-e^{-\alpha(\lambda)W}) \qquad \text{Eqn. 2}$$

where, q is the elementary charge, xj is the (metallurgical) junction depth 210, W is the width of the depletion region 220, and xn 221 and xp 222 (W=$x_p$+$x_n$) are the depth the depletion extents in the n and p sides of the junction. These are given by:

$$x_n = \sqrt{\frac{2\varepsilon_0\varepsilon_r(V_0+V_r)}{q}\left(\frac{N_d}{N_a(N_a+N_d)}\right)} \quad \text{Eqn. 3}$$

$$x_p = \sqrt{\frac{2\varepsilon_0\varepsilon_r(V_0+V_r)}{q}\left(\frac{N_a}{N_d(N_a+N_d)}\right)} \quad \text{Eqn. 4}$$

where $V_r$ is the reverse bias applied to the junction and $V_0$ is the built in potential of the junction:

$$V_0 = \frac{k_B T}{q}\ln\left(\frac{N_a N_d}{n_i^2}\right) \quad \text{Eqn. 5}$$

with $k_B$ Boltzmann's constant, T is the absolute temperature and $n_i$ is the intrinsic carrier density. The diffusion current is given by:

$$\begin{aligned}Jdiff(\lambda, xj) = &\, q\cdot\frac{Dp}{Lp}\cdot pn0\cdot\frac{1-\cosh\left(\frac{xepi-xj-xn}{Lp}\right)}{\sinh\left(\frac{xepi-xj-xn}{Lp}\right)}+q\cdot\\ &\frac{Dp}{Lp}\cdot ConstantC(\lambda)\cdot\frac{e^{-\alpha(\lambda)\cdot xepi}}{\sinh\left(\frac{xepi-xj-xn}{Lp}\right)}+q\cdot ConstantC(\lambda)\cdot\\ &Dp\cdot e^{-\alpha(\lambda)\cdot(xj+xn)}\cdot\left(\alpha(\lambda)-\frac{\cosh\left(\frac{xepi-xj-xn}{Lp}\right)}{Lp\cdot\sinh\left(\frac{xepi-xj-xn}{Lp}\right)}\right)+\\ &q\cdot\frac{Dn}{Ln}\cdot np0\cdot\frac{1-\cosh\left(\frac{xj-xp}{Ln}\right)}{\sinh\left(\frac{xj-xp}{Ln}\right)}+\\ &q\cdot\frac{Dn}{Ln}\cdot ConstantF(\lambda)\cdot\frac{1}{\sinh\left(\frac{xj-xp}{Ln}\right)}-\\ &q\cdot ConstantF(\lambda)\cdot Dn\cdot e^{-\alpha(\lambda)\cdot(xj-xp)}\cdot\left(\alpha(\lambda)+\frac{\cosh\left(\frac{xj-xp}{Ln}\right)}{Ln\cdot\sinh\left(\frac{xj-xp}{Ln}\right)}\right)\end{aligned} \quad \text{Eqn. 6}$$

where $D_p$ and $D_n$ are the diffusion constants for holes and electrons respectively, $L_p$ and $L_n$ are the diffusion lengths of excess carriers, $x_{epi}$ is the epi layer thickness 230, $n_{p0}=n_i^2/N_a$ and $p_{n0}=n_i^2/N_d$, the equilibrium minority carrier densities and the constants:

$$ConstantC(\lambda) := \frac{\Phi 0\cdot\alpha(\lambda)\cdot Lp^2}{Dp\cdot(1-\alpha(\lambda)^2\cdot Lp^2)} \quad \text{Eqn. 7}$$

$$ConstantF(\lambda) := \frac{\Phi 0\cdot\alpha(\lambda)\cdot Ln^2}{Dn\cdot(1-\alpha(\lambda)^2\cdot Ln^2)} \quad \text{Eqn. 8}$$

Figure 3:
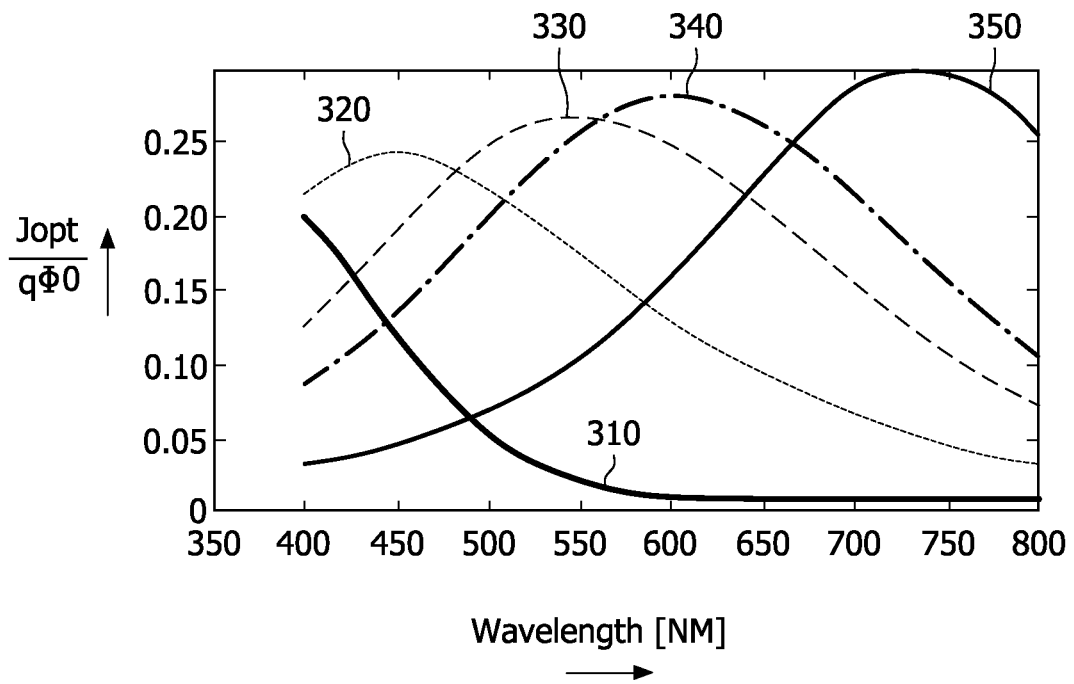
FIG. 3 shows the spectral responsivity for different junction depths of a silicon photodiode used in an embodiment of a light source, according to the present invention.

From these equations the spectral response of a pn-junction can be calculated as a function of the junction depth 210. In FIG. 3 $J_{opt}/q\Phi_0$ is plotted for different junction depths (310=0.5 μm, 320=1 μm, 330=2 μm, 340=3 μm and 350=10 μm) as a function of the wavelength of light. The parameters used are: $x_{epi}$=15 μm, $N_d$=10$^{26}$ m$^{-3}$, $N_a$=4.37*10$^{21}$ m$^{-3}$, $L_n$=447 μm, $L_p$=0.289 μm, with calculation of $D_p$ and $D_n$ through:

$$Dp := Vt\cdot\left(370+\frac{370}{1+1.156310^{-18}\cdot Nd}\right) \quad \text{Eqn. 9}$$

$$Dn := Vt\cdot\left(232+\frac{1180}{1+1.12510^{-17}\cdot Na}\right) \quad \text{Eqn. 10}$$

Figure 4:
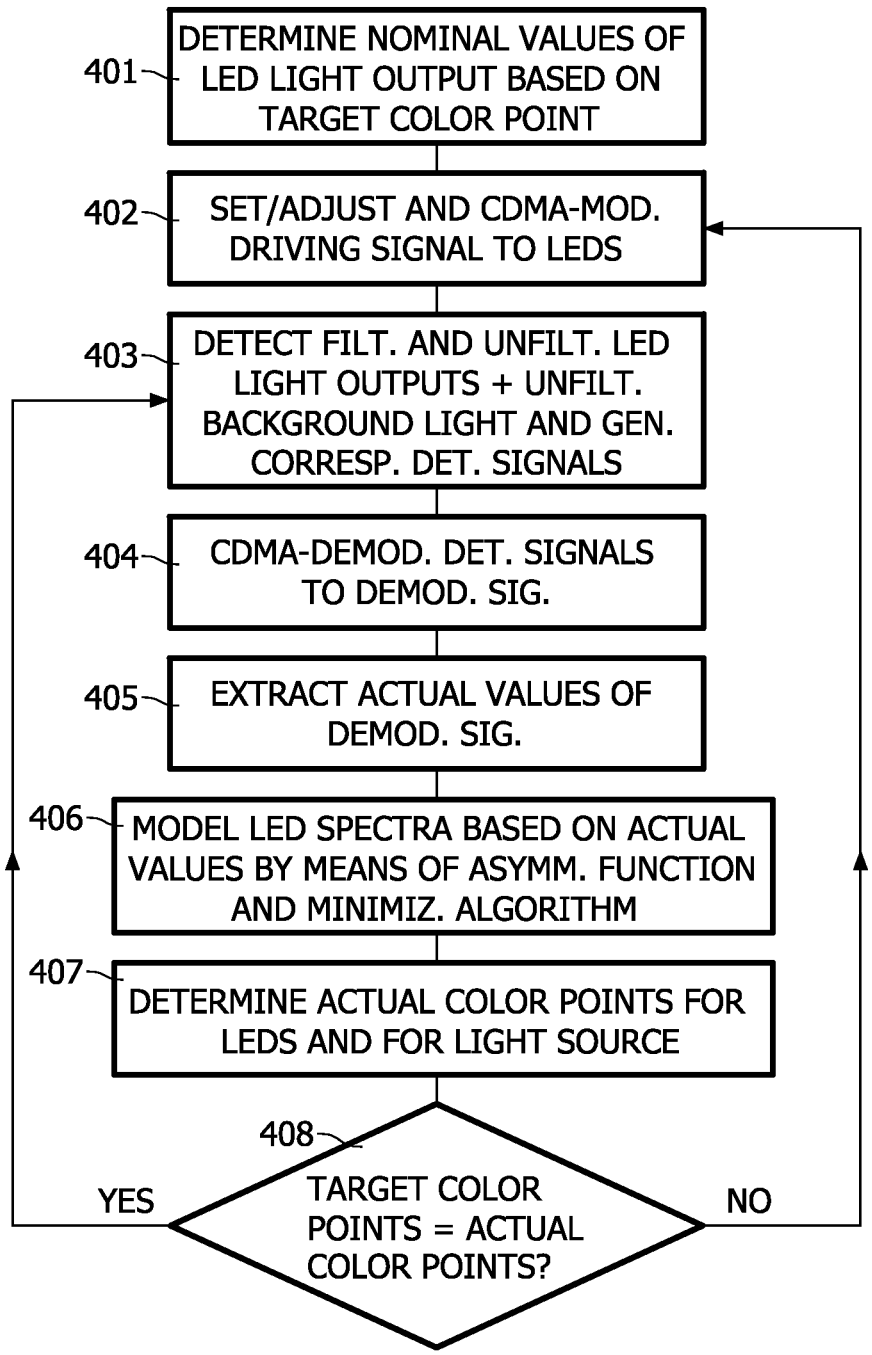
FIG. 4 is a flow chart showing the steps of an embodiment of the method for controlling color generation in a light source, according to the present invention.

Referring to the flow chart of FIG. 4, the light source, and more particularly the color control system thereof operates as follows. The control unit 103 receives input about a desired light output from a user, or has preprogrammed information thereof. The desired light output is given as, or is translated into a target color point for the light source 101. The control unit 103 is arranged for calculating nominal driving signals for the LEDs 107a-c on basis of the target color point, as shown in box 401. The driving signals are then individually CDMA coded by means of the CDMA modulator 105, in box 402, before fed to the LEDs 107a-c, and thereby the light outputs of the LEDs 107a-c become individually identifiable in the light detection path. Due to imperfections of the LEDs 107a-c, as discussed above, the expected light output is not obtained, so the control system including feedback is employed. Hence, the photo detectors 111a-d, detect the actual light outputs of the LEDs 107a-c, box 403. Each one of the (filtered) photo detectors 111a-d detects a part of the light output of the light source 101, and generates a corresponding detection signal, box 403. The M+1 detection signals are then fed to the CDMA demodulator 113, which CDMA demodulates the detection signals, box 404. More particularly, the demodulator 113 correlates each detection signal with a correctly time synchronized copy of each one of the CDMA codes that have been used by the modulator 105. Thus, for each 'filtered' detection signal, the modulator outputs N demodulated signals, which are related to actual values, as detected, of the light outputs of the N LEDs 107a-c. The demodulator 113 additionally outputs a background signal and N unfiltered detector responses, boxes 403 and 404, which are generated by demodulation of the unfiltered photo detector signal 111d. Consequently, all in all, N*(M+1)+1 signals, i.e. 13 signals in this embodiment, are fed from the demodulator 113 to the control unit 103.

The control unit 103 comprises means, such as software code, for determining the spectral output of each LED 107a-c on basis of the actual values inherent in the demodulated signals. Thus, the actual values of the demodulated signals are extracted, box 405. The determination of the spectral output of each LED 107a-c employs an algorithm for asymmetric function modeling of the spectral outputs. According to this embodiment an asymmetric double sigmoidal function as shown in FIG. 5 and below as Eqn. 11, is used for modeling the LED spectra, or more particularly the spectral densities, box 406.

$$S(\lambda) = \frac{A_0}{1+e^{\frac{-(\lambda-\lambda_{peak})}{w_1}}}\left[1-\frac{1}{1+e^{\frac{-(\lambda-\lambda_{peak})}{w_2}}}\right]+A_1 \quad \text{Eqn. 11}$$

In this function $A_0$ is a pre-factor, $A_1$ is a background offset, $\lambda_{peak}$ is the peak wavelength of the LED spectrum, and $w_1$ and $w_2$ are parameters describing width and asymmetry of the spectrum. Preferably the photo detector spectral characteristics are chosen such that they all cover at least a detectable part of the spectrum of each LED 107a-c, i.e. the actual values, e.g. photocurrent signals, from the different photo detectors are above zero. Initially, for each LED 107a-c the actual values are compared with each other in order to determine which photo detector gave the highest response. The peak value of its spectral characteristic is used as an assumed start value of $\lambda_{peak}$. It should be noted that the photo detector spectral characteristics are fully known. The unfiltered photo detector 111d is used for measuring the background offset $A_1$ during an off state of the LEDs, and for measuring the total LED light output, which gives the pre-factor $A_0$, during an on state of the LEDs. Furthermore, the width and asymmetry parameters $w_1$ and $w_2$ are limited to values larger than 5 nm in the fitting algorithm, which is a realistic boundary condition from an LED operation point of view. For robustness at least two combinations of $w_1$ and $w_2$, one where $w_1 < w_2$ and one where $w_1 > w_2$ are used. Using all actual values the best fit for the LED spectrum is then calculated with a minimization algorithm SSE (Sum Square Error), Eqn. 12, where the difference between the calculated detection signal values, obtained for the anticipated LED spectrum, and the actual values for that LED is determined.

$$SSE = \sum_{1}^{M} (calculatedvalue - actualvalue)^2 \qquad \text{Eqn. 12}$$

It should be noted that like there are alternatives to the modeling function above, there are alternative methods, such as Newton-Raphson for the minimization algorithm of Eqn. 12.

More particularly, for each LED, an iteration is performed, where the peak-value $\lambda_{peak}$ and the two width values $w_1$ and $w_2$ are systematically varied for modeling different LED spectra. Further, for each different modeled LED spectrum, it is integrated with the known response characteristics of the photo detectors 111a-c. The calculated detection signals, thus obtained, are compared, in the minimization algorithm, Eqn. 12, with the actual values, i.e. the measured values, received at the color control unit 103 from the CDMA demodulator 113. The peak and width values resulting in the lowest SSE, or an SSE lower than a preset limit value, are assumed to be representative for the LED spectrum, which is obtained from the modeling function, Eqn. 11, with these input values. Then the color points of the LEDs 107a-c are calculated by convoluting the modeled LED spectra with the color matching functions of the standard observer, box 407.

The control unit thus comprises means (e.g. software code) for comparing the target color point with the actual color point. This is done for the color points of the individual LEDs as well as for the total color point, which is obtained by adding the LED spectra together and convoluting the sum with the color matching function of the standard observer, see box 408. If there is a difference, then the driving signals are adjusted, wherein the method returns to box 402, in order to reduce, ideally delete, but in praxis that is difficult, the difference. If there is no difference the method returns to box 403 where the light output is again detected. In fact, according to this very embodiment, the method uses an upper limit of the difference, i.e. if the difference is smaller than a predetermined upper limit, then no adjustment is performed.

The CDMA modulation is exemplified as CDMA modulation using a synchronous system where Walsh-Hadamard codes are utilized. Walsh-Hadamard is an algorithm for generating statistically unique sets of numbers for use in encryption and cellular communications, and is also known as "pseudo-random noise code". The codes generated by the algorithm are orthogonal mathematical codes. This means that if two Walsh codes are correlated the result is intelligible only if these two codes are the same. As a result, a Walsh-Hadamard-encoded signal appears as to be random noise to a CDMA demodulator, unless that demodulator uses the same signature code as the one used to modulate the incoming signal. By avoiding the use of a so called DC (Direct Current) code, which is a part of a Walsh-Hadamard set of codes that is related to an average DC signal component, the system is made robust against constant ambient light.

In one embodiment of the color controlled light source 101 the specific coding scheme of the CDMA modulator 105 is based on On-Off Keying. On-Off Keying (OOK) modulation is a type of modulation where digital data is represented as the presence or absence of carrier wave. In its simplest form the presence of a carrier for a specific duration represents a binary one, and its absence for the same duration represents a binary zero, although in principle any digital encoding scheme may be used.

The signature modulation code assigned to each light element 107a-c is carried in the signal by On-Off Keying modulating the first part of each pulse, which is shown in FIG. 6. Here two examples of the driving signal to the LED in order to guarantee the required illumination are shown: (1) applying pulse width modulation (PWM) to the second part of the pulse, and (2) applying pulse amplitude modulation (PAM) to the pulse. In FIG. 6 "chip 0" and "chip 1" will have different widths. In principle this would lead to a variation in the light output of the LED. Nevertheless, this can be repaired by using balanced codes, which means that there is provided the same number of chips 0 and 1. Therefore the width of pulses, averaged over a code word, will be exactly the average value between "chip 0" and "chip 1" widths.

In yet another embodiment of the invention, as illustrated in FIG. 7, the modulation method is a generalization of BiPhase (BP) modulation, to allow an arbitrary duty cycle. When the duty cycle equals 50%, Duty Cycle BiPhase (DC-BP) degenerates to BP modulation. In this case, the code embodying the individual signature that each light element is assigned is carried in the signal by transmitting "chip 0" and "chip 1" accordingly. To guarantee the required illumination there are two options: (1) modify the duty-cycle of the pulses, and (2) modify the amplitude of the pulses.

For environments in which multiple light sources are operating, synchronicity between the light sources may not be assumed, and may even be undesirable. In such cases it is important that the degree of cross-correlation between the CDMA codes used for light elements across the light sources is low and bounded. This provides immunity to interference between light sources that could otherwise lead one light source to incorrectly detect the spectral output from a neighbor as that of its own. Such immunity can be achieved by using Gold codes. These are formed my means of modulo-2 additive properties of maximal length pseudo-random binary sequences (PRBS). Two maximal length PRBS are driven by a synchronous clock and added together bit-by-bit in a modulo-2 adder to form a Gold code. Addition of two m-length ($2^m - 1$ states) maximal length PRBS codes results in the creation of an m-length Gold code. An entirely new Gold code will result for each bit shift between the two PRBS codes added together, i.e. two 10-length (1023 bits long) PRBS codes added together in all possible combinations can be used to create 1023 unique Gold codes. This means that with very cheap and simple logic circuitry, such as shift registers connected with a feedback path, a large number of unique Gold codes can be generated very quickly and easily. By appropriate choice of a subset of the Gold codes produced from a pair of PRBS sequences, the cross-correlation between the chosen Gold codes will be low and with an upper bound that can be mathematically pre-calculated. This makes it a simple job for the demodulator circuit to identify when it has correctly "locked on" to the spectral output of its own light elements, robustly ignoring interference, i.e. cross-correlation, from external interferers, i.e. other light sources. As a result, the Gold code based system described here is an asynchronous CDMA design which may be both more robust and easier to implement than a synchronous approach, such as the Walsh-Hadamard coding.

Figure 8:
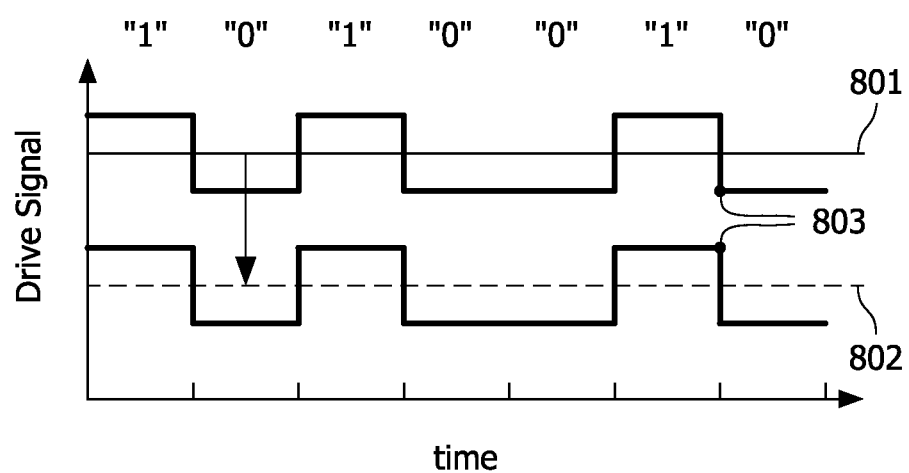
FIG. 8 shows the use of an analog drive signal in combination with a pseudo random binary sequence (PRBS) code.

In yet another embodiment of the invention, the nominal output intensity of the light elements 107a-c is set by the level of the drive signal, supplied in the form of a DC or arbitrary analogue waveform, by each driver 109a-c. As illustrated in FIG. 8, the drive signal level is chosen according to the required optical output level (high output level 801 or low/dimmed output level 802) of the light elements 107a-c (shown for one element only) to produce a user specified color point. Each drive signal is it self amplitude modulated by a unique PBRS Gold code 803 supplied to each of the drivers 109a-c by the CDMA modulator 105. Following the detection and demodulation method described above, the feedback control to correct for color deviation from a reference color point is achieved by changing the analogue drive signal of the particular light element 107a-c that requires adjustment. Also dimming of the total light output of the color controlled light source 101 can be achieved by changing the analogue drive signals.

Above, embodiments of the light source and the method according to the present invention as defined in the appended claims have been described. These should be seen as merely non-limiting examples. As understood by a skilled person, many modifications and alternative embodiments are possible within the scope of the invention.

For example, the color detection technique is not limited to LED light. In principle also other light sources will work, provided that good functions, which describe the general spectral outputs of those light sources are available. Such other functions could very well be others than an asymmetric double sigmoidal function.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A color controlled light source comprising:
a plurality of colored light elements;
a plurality of photo detectors, whose spectral characteristics are different and together at least substantially cover the total spectrum of said light elements, which photo detectors detect the light output of the light source, and generate corresponding detection signals;
a color control unit for generating driving signals to said light elements on the basis of said detection signals and a predetermined target color point of the light output of the light source,
a modulator for individual signature modulation of the driving signal to each one of said light elements; and
a demodulator for individual signature demodulation of said detection signals and extraction, from each detection signal, of each actual value of the light output of each one of said light elements;
wherein said color control unit is configured to determine the spectral output of each light element on the basis of said actual values, to determine an actual color point of the light output of the light source from the spectral outputs of all light elements, and to compare the target color point of the light output of the light source with the actual color point of the light output of the light source and, if there is a difference, to adjust the driving signals in order to minimize the difference,
wherein determining the spectral output of each light element comprises determining said spectral output by means of an algorithm for asymmetric function modeling of the spectral output of a light element.

2. A light source according to claim 1, wherein the modulator is a spread spectrum modulator, which provides individually, spread spectrum-coded modulation of said driving signals.

3. A light source according to claim 1, wherein the modulator is a CDMA modulator, which provides individually CDMA-coded modulation of said driving signals.

4. A light source according to claim 3, wherein said CDMA-coded modulation is one of On-Off Keying and BiPhase modulation.

5. A light source according to claim 4, wherein said photo detectors are chosen from a group of detectors comprising RGB sensors, XYZ sensors, and flux sensors.

6. A light source according to claim 5, wherein the group of detectors comprises the RGB sensors, and wherein any one of the RGB sensors comprises a silicon photodiode arranged to have a spectral responsivity depending on either its junction depth or its depletion region width.

7. A light source according to claim 6, wherein the silicon photodiode is arranged to have the spectral responsivity depend on its depletion region width, and wherein the depletion region width is arranged to be controllable with a bias voltage.

8. A light source according to claim 1, wherein said algorithm for asymmetric function modeling uses an asymmetric double sigmoidal function.

9. A light source according to claim 1, wherein said individual signature modulation is performed by means of Gold codes.

10. A method for controlling color generation in a light source comprising a plurality of colored light elements, said method comprising the steps of:
detecting the light output of the light source by means of photo detectors, whose spectral characteristics are different and together at least substantially cover the total spectrum of said light elements, and generating corresponding detection signals; and
generating driving signals to said light elements on the basis of said detection signals and a predetermined target color point of the light output of the light source,
individual signature modulating the driving signal to each one of said light elements;
wherein said detecting step comprises extracting each actual value of the light output of each one of said light elements by demodulating said detection signals and identifying each individual signature; the method further comprising:
determining the spectral output of each light element on the basis of said actual values;
determining an actual color point of the light output of the light source from said spectral outputs of all light elements; and
comparing said target color point of the light output of the light source with said actual color point of the light output of the light source and, if there is a difference, adjusting said driving signals in order to minimize the difference, said determining the spectral output of each light element being performed by means of an algorithm for asymmetric function modeling of the spectral output of a light element.

11. A method according to claim 10, said individual signature modulating the driving signal to each one of the light elements consisting of individually coded spread spectrum modulation of said driving signals.

12. A method according to claim 10, said individual signature modulating the driving signal to each one of the light elements consisting of individually coded CDMA modulation of said driving signals.

13. A method according to claim 10, wherein said individual signature modulation is based on one of On-Off Keying and BiPhase modulation.

14. A method according to claim 10, wherein the light output of the light source is detected by means of one of an RGB sensor, an XYZ sensor, and a flux sensor.

15. The method of claim 10, wherein said algorithm for asymmetric function modeling uses an asymmetric double sigmoidal function.

16. The method of claim 10, wherein individual signature modulating the driving signal for each one of said light elements comprises applying Gold codes to the driving signals.

17. The method of claim 10, wherein determining the actual color point of the light output of the light source from the spectral outputs of all light elements includes determining the actual color points of all light elements.

* * * * *